United States Patent
Hilde (10) Patent No.: US 9,317,040 B1
(45) Date of Patent: Apr. 19, 2016

(54) AIRCRAFT GROUND EFFECT ALTIMETER FOR AUTONOMOUS LANDING CONTROL

(71) Applicant: THE UNITED STATES OF AMERICA, AS REPRESENTED BY THE SECRETARY OF THE NAVY, Washington, DC (US)

(72) Inventor: Jeffrey J. Hilde, Onyx, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 87 days.

(21) Appl. No.: 14/314,264

(22) Filed: Jun. 25, 2014

(51) Int. Cl.
*G05D 1/00* (2006.01)
*G06F 17/00* (2006.01)
*G05D 1/04* (2006.01)
*G01C 23/00* (2006.01)
*G01C 5/00* (2006.01)

(52) U.S. Cl.
CPC ............... *G05D 1/042* (2013.01); *G01C 5/005* (2013.01); *G01C 23/00* (2013.01)

(58) Field of Classification Search
None
See application file for complete search history.

(56) References Cited

U.S. PATENT DOCUMENTS

2004/0267444 A1 * 12/2004 Coatantiec ............ G01C 5/005
701/533

* cited by examiner

*Primary Examiner* — Mussa A Shaawat
*Assistant Examiner* — Kyung Kim
(74) *Attorney, Agent, or Firm* — James M. Saunders (57) ABSTRACT

Embodiments of the invention use ground effect to determine how close an aircraft is to the ground. An electronic processor communicates with a navigation unit on an aircraft. The aircraft has an electronic instrument cluster for takeoff and landing control. An aircraft model is received from the navigation unit and used to compute aircraft modeled quantities. An initial altitude of the aircraft is received from a barometric altimeter. Initial aircraft velocities and initial aircraft orientations are from the navigation unit. The aircraft model is initialized. Accelerations, rotation, and altitude from the output of accelerometers, gyros, and the barometric altimeter are received. Surface and thrust control settings are received from the electronic instrument cluster. A best hypothesis for ground altitude is computed and the computed ground altitude having the lowest likelihood of error is reported.

10 Claims, 4 Drawing Sheets

AIRCRAFT GROUND EFFECT ALTIMETER FOR AUTONOMOUS LANDING CONTROL

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to autonomous vehicle navigation.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments of the invention relate to an autonomous or automatic aircraft landing control signal that uses ground effect to determine how close an aircraft is to the ground as the source of information needed for automatic landing. Embodiments determine relative positioning with respect to the ground for the landing of aircraft, which is especially useful when the landing site status and conditions are sub-optimal including conditions of heavy dust, smoke, or fog.

Embodiments provide a unique solution for aircraft landing control using ground effect to determine altitude, a ground effect altimeter (GREALT). Ground effect is the increased lift that an aircraft experiences when it is within about one wingspan (or one rotor diameter in the case of a helicopter) of the surface of the ground during take-off or landing. This increased lift can be indirectly observed as it affects the behavior of the aircraft. The aircraft orientation and position are a function of the flight controls and the quantity and direction of aircraft power delivered as thrust. As the aircraft comes closer and closer to the ground, it experiences ground effect and the lift of the aircraft increases, which causes it to be higher in position above the ground than it would be otherwise. The ground effect has changed the aircraft response to the flight controls. By modeling the aircraft and the ground effect for the aircraft as a function of the flight surface control settings, and as a function of a hypothesized altitude, synthetic output of aircraft gyro, accelerometer, and air pressure instruments are produced. These synthetic outputs are then compared to the actual measurements of the actual aircraft gyro, accelerometer, and air pressure instruments. A new altitude is hypothesized and new outputs are synthesized until a match between the synthetic and actual instrument data is found. When a match is found, the hypothesized altitude used in the synthesis of the aircraft instruments measurements that produced the match is taken as the actual altitude and this altitude then becomes a control signal for the landing of the aircraft.

Although embodiments of the invention are described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

At the outset, it is helpful to describe various conventions, parameters, and terminology associated with embodiments of the invention and referred to in the associated figures.

Aircraft

Figure 2:
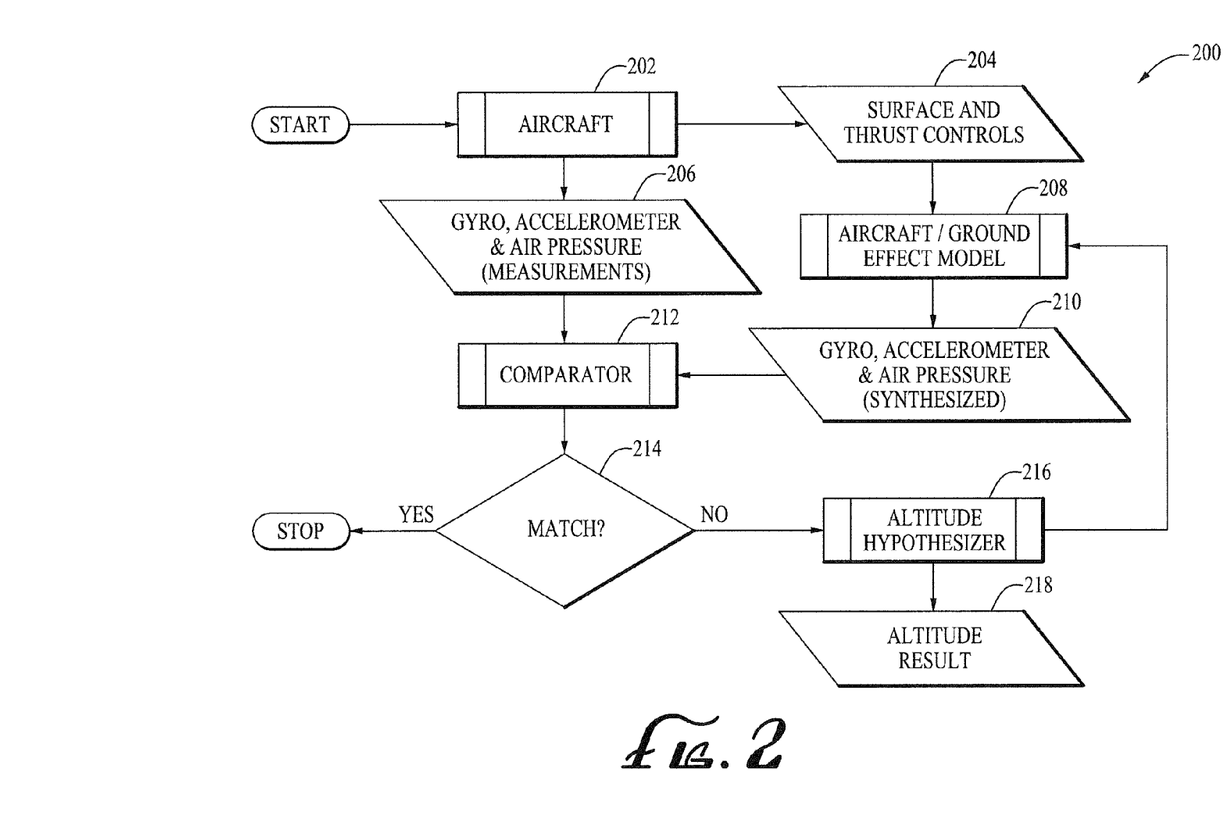
FIG. 2 is an exemplary block process diagram, according to some embodiments of the invention.

The term "aircraft" is used to designate: (i) a fixed or rotary-winged air vehicle, (ii) the distance to the ground during landing and takeoff, (iii) the gyros, accelerometers, and air pressure sensors aboard, and (iv) the data indicating current surface and thrust control settings. Reference character 202 in FIG. 2 is used to represent the aircraft.

Surface & Thrust Control Settings

The Surface & Thrust Control Settings, depicted as reference character 204, are the data that reports the current settings of the surface and thrust controls for the Aircraft 202 to the Aircraft/Ground Effect Model 208, which contributes to the model's simulation of the state of the Aircraft.

Gyro, Accelerometer, & Air Pressure (Measured)

The gyro, accelerometer, and air pressure (measured), depicted as reference character 206, are sometimes also referred to as the "Aircraft Sample," "Data Sample," or "System Sample," and is the data that is coming from the settings and sensors of the Aircraft 202 which indirectly contain the altitude information. The extraction of altitude into a form directly usable by an automatic landing system is one purpose of embodiments of the invention. This data is also synthesized by the Aircraft/Ground Effect Model 208 as the model's output. There is more than on Altitude Result 218 per sample of this data. An iteration may begin again with each new sample of this data.

Gyro, Accelerometer, & Air Pressure (Synthesized)

The gyro, accelerometer, & air pressure (synthesized), depicted as reference character 210, are also referred to as the "Model Sample." The Model Sample is a synthesized data sample and is a reproduction of a gyro, accelerometer, & air pressure (measurements) 206 sample. The Model Sample 210 is a function of the surface and thrust control settings 204 from the aircraft 202 and altitude hypothesis from the altitude hypothesizer 216 and is the output of the Aircraft/Ground Effect Model 208.

Altitude Hypothesizer

The Altitude Hypothesizer, depicted as reference character 216, is sometimes referred to as the Hypothesizer, hypothesizes an altitude, the distance the Aircraft 202 is above the ground. The hypothesis is then delivered to the Aircraft/Ground Effect Model 208. The Hypothesizer 216 uses the score, error, or rank determined by the Comparator 212 to conduct a search strategy in Hypothesis space looking for the Hypothesis that when used by the Aircraft/Ground Effect Model, produces a Gyro, Accelerometer, & Air Pressure (synthesized) data sample that matches the Gyro, Accelerometer, & Air Pressure (measurements) data sample as determined by the Match 214 decision. When this match has been found, the Hypothesis that produced the match is then the altitude of the Aircraft above the ground. The Hypothesizer 216 uses an optimization search strategy such as Stochastic, Steepest descent, Newton's Method, Simulated Annealing, Swarm, Random, or some other method to determine the Hypothesis it will next send to the Aircraft/Ground Effect model 208.

Altitude Hypothesis

The Altitude Hypothesis, is also referred to as the Hypothesis, is an instance of the altitude that the Hypothesizer 216 proposes to be the distance of the Aircraft from the ground. The Altitude Hypothesis is the output of the Altitude Hypothesizer 216 and which is sent to the Aircraft/Ground Effect Model 208 and used to create the synthesized data sample. There is one Altitude Hypothesis for every Gyro, Accelerometer, & Air Pressure (synthesized) data sample 210 and at most one Altitude Hypothesis is determined to be the Altitude Result 218.

Aircraft/Ground Effect Model

The Aircraft/Ground Effect Model 208 is sometimes referred to as "the Model," and is computer code (the computer executable instructions) or any device that models the Aircraft 202. The model's (208) output (output is shown as reference character 210) is a function of the Altitude Hypothesis and the Surface and Thrust Control Settings 204 data available from the Aircraft 202. The model outputs 210 are faithful to the aircraft 202 such that for any Altitude Hypothesis from the Altitude Hypothesizer 216 and for any Surface and Thrust Control Settings 204 from the Aircraft. The model's output 210 is very similar to the Gyro, Accelerometer, & Air Pressure (measurements) 206 data sample, given that the Altitude Hypothesis is true of the Aircraft 202 when the Gyro, Accelerometer, & Air Pressure (measurements) data sample was taken. Subject matter experts implement the Aircraft/Ground Effect Model 208 to ensure accuracy of function. For each Altitude Hypothesis, the Aircraft/Ground Effect Model 208 produces a Gyro, Accelerometer, & pressure (synthesized) 210 data sample output ("the Model Sample").

Comparator

The Comparator 212 compares the Aircraft Sample 206 to each Model Sample 210 delivered from the Model 208 and from among the Model Samples, and determines the Model Sample that is most similar to the Aircraft Sample. The Comparator 212 determines how similar a Model Sample 210 is to the Aircraft Sample 206 by score, by error or by rank, or by other metric that has shown the ability to grade the similarity of the Model Sample to the Aircraft Sample. For example, score is computed as the correlation of the Model Sample 210 with the Aircraft Sample 206 where the higher the score, the more similarity is indicated. The Model Sample 210 with the highest score is the sample with the most similarity.

Error is computed as the difference between the Model Sample 210 and the Aircraft Sample 206 where the closer the error is to zero, the more that the similarity is indicated. The Model Sample 210 having an error closest to zero is the sample with the most similarity.

Rank is determined by forming sets of Model Sample 210 members where each Model Sample is a member of at least one set. The Model Sample 210 most similar to the Aircraft Sample 206 is selected from each set as the top rank Model Sample of the set. Then, by selecting the Model Sample 210 most similar to the Aircraft Sample 206 from among the top ranked Model Samples of each set, the top ranked Model Sample of all the Model Samples is determined and is the sample with the most similarity to the Aircraft Sample. The determination of the best method of comparison is by way of score, error, or rank to be used in a particular implementation of embodiments of the invention and is, thus, dependent on application-specific conditions.

Match

The Match 214 decision either continues operation and a new Hypothesis is generated or a Match has been found and further operation stops. When the Model Sample 210 has been found that matches the Aircraft Sample 206, then the Hypothesis from the Hypothesizer 216 used to generate the Model Sample now matches reality. The Match 214 decision is made (in the case when the Comparator 212 is using score) when the score exceeds a threshold that has been set high enough (as determined from test results) to give low rates of false Results and low enough to give high rates of true Results.

In the case when the Comparator 212 is using error, the Match decision 214 is made when the error crosses below a threshold that has been set low enough to give high rates of true Results. In the case when the Comparator 212 is using rank, the Match decision 214 is made when the Hypothesis space has been sufficiently sampled (as determined from test results) to give low rates of false Results and high rates of true Results.

Result

The Altitude Result 218, sometimes referred to as "the result," is the Altitude Hypothesis that was used by the Model 208 to produce the matching Model Sample 210. This information is true about the Aircraft Sample 206 and, thus, extracted from the Aircraft Sample and is now in a form that is directly usable by flight control for the automatic landing of the aircraft 202.

Apparatus/System Embodiments

Figure 1:
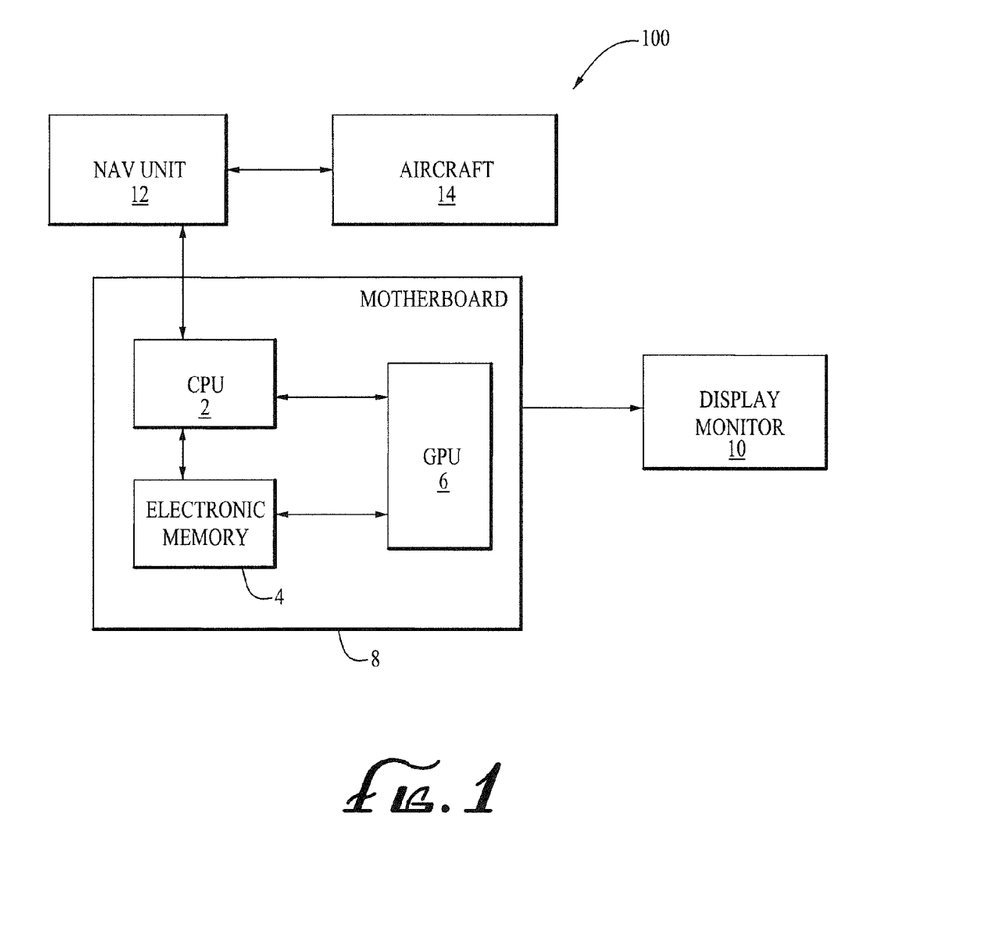
FIG. 1 illustrates components of some systems and/or articles of manufacture, according to some embodiments of the invention.

With reference to FIG. 1, apparatus/system embodiments are collectively shown as reference character 100 and include a Central Processing Unit (CPU) 2 operatively associated with electronic memory 4 and a graphics processing unit (GPU) 6, operatively associated with a display monitor 10, to display a visual depiction of the synthesized data. Two-way arrows are used to depict communication between both of the components. A one-way arrow is used to show information going from one component to another component.

The central processing unit 2 is the hardware within a computer that carries out the instructions of a computer program by performing the basic arithmetical, logical, and input/output operations of the system. The CPU 2 is operatively-associated with memory 4, which includes data and stored instructions. The CPU 2 and memory 4 are both operatively-associated with the GPU 6. The GPU 6, also known as a visual processing unit (VPU), is a specialized electronic circuit constructed to rapidly manipulate and alter memory to accelerate the building of images in a frame buffer (if needed) intended for output to a display. The memory 4 receives input, and stores software, which the CPU 2 and GPU 6 use to perform the processes described herein.

Reference character 8 designates a motherboard, to which the CPU 2, memory 4, and GPU 6 are electrically-associated. Reference character 10 is the visual display monitor (screen) to display a visual depiction of the synthesized data. In some applications, depending on the verification requirements, a visual verification by a user is important to provide an additional layer of validation before acting on the processing result. As such, all of the processes described can be represented on the visual display monitor 10 to aid the user, as needed. Some embodiments, therefore, include the display monitor 10, which is sometimes referred to as a visual display screen.

Reference character 12 is a navigation unit (sometimes referred to as a navigation system) such as, for example, one associated with an airborne vehicle 12 (sometimes referred to as "aircraft" or similar terms). In embodiments, the navigation unit 12 is associated with a fixed or rotary winged aircraft 14. The fixed or rotary-winged aircraft 14 is configured with an electronic instrument cluster to assist with takeoff and landing control.

Article of Manufacture Embodiments

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk," CD-ROM, RAM, a PROM, an EPROM, a FLASH-EPROM, any other memory chip or cartridge, a file server providing access to the programs via a network transmission line, and a holographic unit. Of course, those skilled in the art will recognize that many modifications may be made to this configuration without departing from the scope.

In some apparatus/system embodiments, the electronic processor is co-located with the processor readable medium. In other system embodiments, the electronic processor is remotely located from the processor readable medium. It is noted that the steps/acts/tasks/processes described herein including the figures can be interpreted as representing data structures or sets of instructions for causing the computer readable medium to perform the step/act/task/process. Identifying or 'electronically identifying' involves any one or more of the following: 1) associating an electronic marker, tag, or value with a model that identifies it as a match; 2) storing data associated with the model or the parameters of the best match hypothesis in memory at a location indicative that the hypothesis/model matches the aircraft altitude; 3) displaying a synthesized data image (such as a simulated altitude image) on a visual display; or 4) any conventional means of identifying a model as a match.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified in the flow chart and/or block diagram block or blocks.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In the accompanying drawings, like reference numbers indicate like elements. FIG. 1 illustrates the components of some systems and/or articles of manufacture, according to embodiments of the invention. Reference character 100 depicts an apparatus of embodiments of the invention. The individual components depicted in FIG. 1 function together to perform the disclosed methods.

Figures 3, 3A:
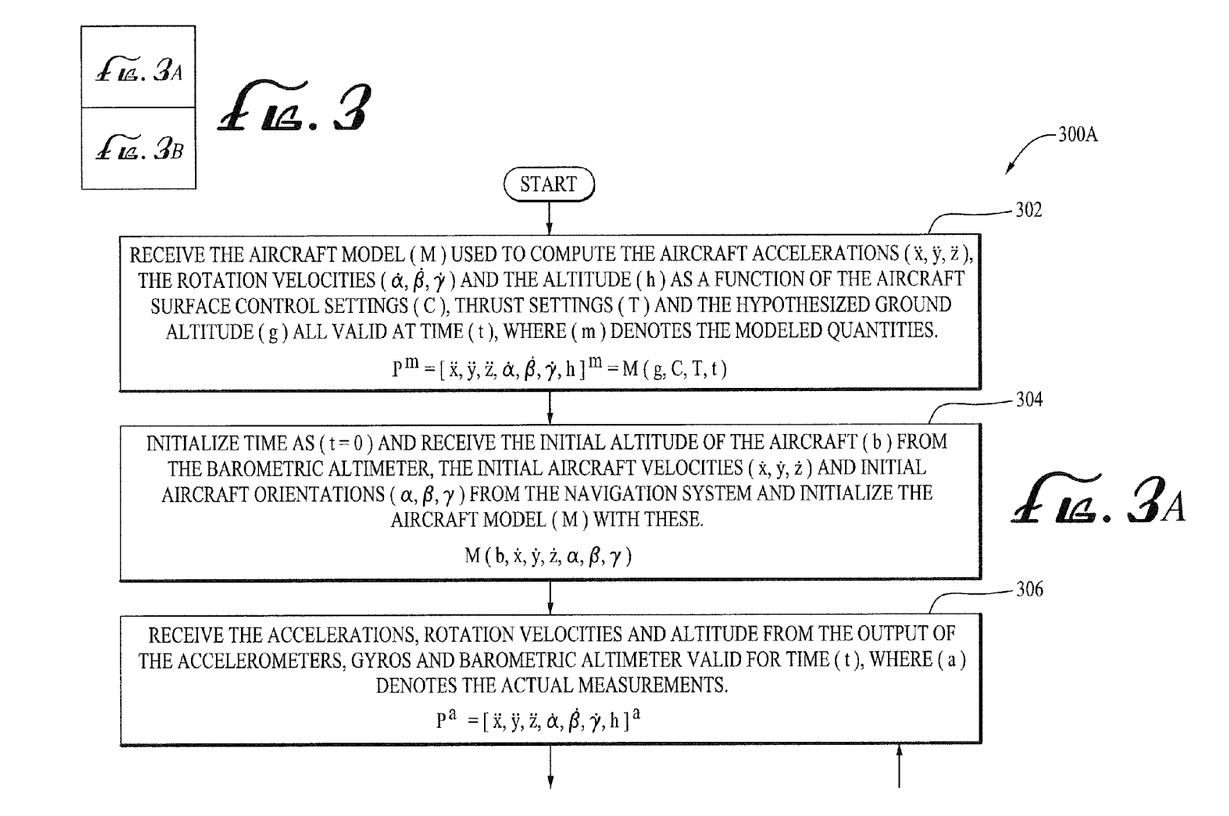
FIG. 3 illustrates how to combine FIGS. 3A & 3B to arrive at a single exemplary flowchart, according to some embodiments of the invention.
FIGS. 3A & 3B combine to form an exemplary flowchart, according to some embodiments of the invention.
Figure 3B:
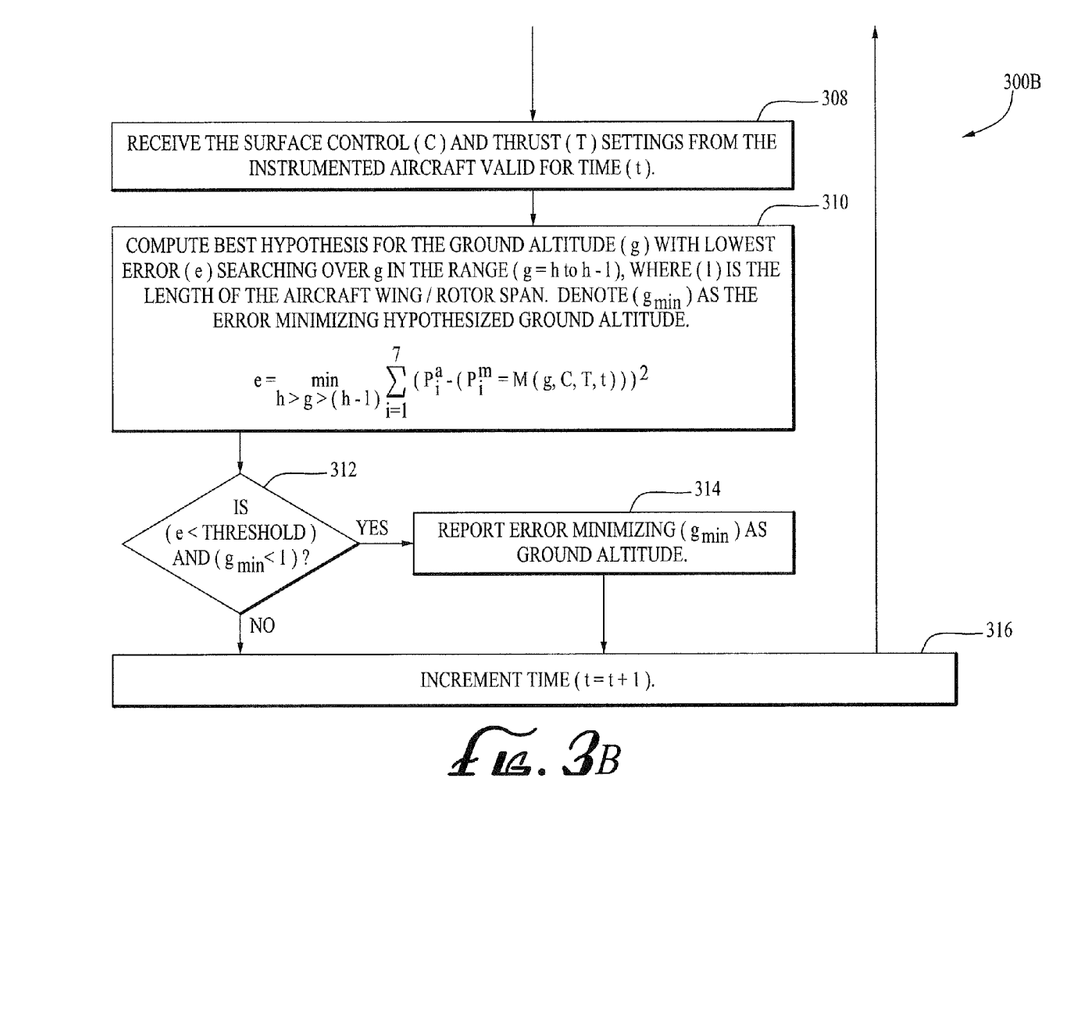

FIGS. 2 and 3A & 3B illustrate an exemplary block process diagram and exemplary flowcharts, respectively, according to some embodiments of the invention. Reference character 200 depicts the block process diagram in FIG. 2. Reference characters 300A & 300B depict the flowcharts in FIGS. 3A & 3B, respectively. In particular, the figures relate to modeling aircraft ground effect using a non-transitory computer readable medium. FIG. 3 illustrates how to combine FIGS. 3A & 3B to arrive at a single exemplary flowchart, according to some embodiments of the invention. FIGS. 2 and 3A & 3B are equally applicable to method and article of manufacture embodiments.

FIG. 2 helps illustrate how the components work together to extract altitude information that is obscurely contained in the gyro, accelerometer, and air pressure data, and is then used for automatic aircraft landing control. High-level processes are depicted as rectangles having two interior vertical lines (see reference characters 202, 208, 212, & 216. Data structures are depicted as parallelograms (see reference characters 204, 206, 210, & 218.

FIG. 2. depicts an embodiment for electronically determining how close an aircraft is to the ground. An electronic processor is configured to communicate with a navigation unit on an aircraft. The aircraft is configured with an electronic instrument cluster for take-off and landing control (task 202). Surface and thrust control settings associated with the aircraft are provided (task 204). In task 206, an aircraft sample is provided. The aircraft sample (task 206) is grouping of gyro, accelerometer, and air pressure measurements from the instrument cluster. The aircraft sample (task 206) has, amongst other useful information, altitude information of the aircraft.

The surface and thrust control settings are reported to an aircraft/ground effect model (task 208). The aircraft/ground effect model (task 208) is configured to output a model sample (task 210). The model sample (task 210) is a synthesized gyro, accelerometer, and air pressure measurements reproduction of the aircraft sample (task 206 depicts the Aircraft Sample).

In task 212, a "comparator" compares the aircraft sample to each model sample and determines which model sample is the most similar to the aircraft sample. The error in the comparison from task 212 is computed. The error is the difference between the model sample and the aircraft sample. The closer the error is to zero, the more that similarity is indicated. The model sample having the error closest to zero has the most similarity to the aircraft sample (task 214). When a match is found in task 214, the "yes" branch is followed and the model sample closest to zero is reported as a match. The match information may be displayed on a visual display screen, hard copy prints, or used in a system configured to receive match input. Additionally, all of the referenced tasks may be displayed on a visual display screen to aid the user.

In embodiments, the aircraft/ground effect model (task 208) is a function of the altitude hypothesis and the surface and thrust control settings. When a match is not found in task 214, the "no" branch is followed to task 216. In task 216, an altitude hypothesis is produced when a match is not found. The altitude hypothesis is an instance of the altitude that a hypothesizer proposes to be the distance of the aircraft from the ground. The altitude hypothesis is used in the model sample and reported to the aircraft/ground effect model (the iterative arrow leading back to task 208).

The altitude hypothesis used by the aircraft/ground effect model ("the model") (task 208) to produce the match is defined as an altitude result. The altitude result is defined as true about the aircraft sample (task 218). The altitude result (task 218) may then be displayed on a visual display screen. The altitude result (task 218) may also be input to the automatic landing control system of the aircraft.

Referring simultaneously to FIGS. 3A & 3B, embodiments of the invention generally relate to determining how close an aircraft configured with a navigation system is to the ground. This is especially useful for automatic aircraft landing control using ground effect. An electronic processor communicates with a navigation unit on an aircraft. The aircraft is configured with an electronic instrument cluster for takeoff and landing control. The aircraft may be fixed or rotary-winged air vehicles. One having ordinary skill in the art will recognize that fixed wing air vehicles have a wingspan and rotary-winged air vehicles have a rotary diameter.

In task 302, an aircraft model (M) from the navigation unit of the aircraft is received. The aircraft model (M) is used to compute aircraft modeled quantities. The aircraft modeled quantities include aircraft accelerations ($\ddot{x},\ddot{y},\ddot{z}$), rotation velocities ($\dot{\alpha},\dot{\beta},\dot{\gamma}$), and altitude (h) as a function of aircraft surface control settings (C), thrust settings (T), and hypothesized ground altitude (g) at time (t). A lower case (m) denotes the aircraft modeled quantities. A capital P is used to designate the state parameters (the set of seven elements in the array), where $P^m=[\ddot{x},\ddot{y},\ddot{z},\dot{\alpha},\dot{\beta},\dot{\gamma},h]m=M(g,C,T,t)$. Time (t) is initialized at (t=0) (task 304).

In task 304, an initial altitude (b) of the aircraft is received from a barometric altimeter on the aircraft. The initial aircraft velocities ($\dot{x},\dot{y},\dot{z}$) and initial aircraft orientations ($\alpha,\beta,\gamma$) are from the navigation system. The aircraft model (M) is initialized as M ($b,\dot{x},\dot{y},\dot{z},\alpha,\beta,\gamma$). In task 306, accelerations, rotation velocities, and altitude as measured by the accelerometers, gyros, and barometric altimeter are received and are valid for time (t). One having ordinary skill in the art will recognize that accelerometers and gyros are found in navigation units and barometric altimeters are included in aircraft instrument clusters. A lower case ($\alpha$) denotes the actual measurements of the aircraft, where $P^\alpha=[\ddot{x},\ddot{y},\ddot{z},\dot{\alpha},\dot{\beta},\dot{\gamma},h]^\alpha$.

The surface control (C) and thrust (T) settings, at time (t), are received from the instrument cluster (task 308). Task 310 computes a best hypothesis. The best hypothesis is for the ground altitude (g) with lowest error (e) searching over g in the range (g=h to h–l), where (l) is the length of the wingspan in fixed wing air vehicle or the rotary diameter when the aircraft is a rotary-winged air vehicle. The error minimizing the hypothesized ground altitude is denoted as ($g_{min}$).

Task 312 (the diamond shaped operator) is a two-part determination. It is determined whether (e)<threshold and $g_{min}$<(l). The threshold is a pre-determined value. One way of setting the threshold is to set it equal to the square of the acceptable error in the measurement of the ground altitude (g). Other ways are also possible, including using statistical methods. When it is determined that (e) is less than the threshold, then the difference between the state parameters corresponding to the aircraft modeled quantities and the state parameters corresponding to the actual measurements of the aircraft are neglected.

Thus, the threshold determines whether the modeled state, $P^m$, matches the actual state, $P^\alpha$. When $(P^m-P^\alpha)^2$ is small (below the threshold), then a ground altitude has been found that causes the model to match the actual measurements.

When it is determined that (e)<threshold and $g_{min}$<(l), then ($g_{min}$) is reported as ground altitude (task 314). When additional data exists or when (e)≥threshold and $g_{min}$≥(l), task 316 increments the time to the next time interval, (t+1), and then the tasks 306 through 314 are iterated through. The iterative process continues until no additional data exists or until (e)<threshold and $g_{min}$<(l).

The aircraft model (M) is computer code (the particular computer executable instructions) for modeling the aircraft modeled quantities. The computer executable instructions are application-specific code depending on the particular aircraft. The lowest error (e) is defined by $$e = \min_{h>g>(h-l)} \sum_{i=1}^{7} (P_i^\alpha - (P_i^m = M(g, C, T, t)))^2.$$

The error minimizing the hypothesized ground altitude ($g_{min}$) may be displayed on a visual display screen. The subscript i in the error determination indexes into the array P. Thus, the summation is from 1 to 7 for the set of seven elements in the array.

Tangible outputs other than a visual display screen are possible without detracting from the merits or generality of embodiments of the invention. As such, embodiments, the tangible outputs may be shown and/or represented as a visual display screen depiction, hard copy printouts, as well as other media using classification/matching information such as, for example, a computer having computer-readable instructions that is configured to use output from embodiments of the invention. The output may be used in programs using the output such as, for example, automatic landing control systems and algorithms.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for automatic aircraft landing control using ground effect to determine how close an aircraft is to the ground, comprising:
   (a) providing an electronic processor configured to communicate with a navigation unit on an aircraft, said aircraft configured with an electronic instrument cluster for takeoff and landing control, said aircraft selected from the group of aircraft consisting of fixed and rotary-winged air vehicles, said fixed wing air vehicles having a wingspan and said rotary-winged air vehicles having a rotary diameter;
   (b) receiving an aircraft model (M) from said navigation unit of said aircraft;
   (c) using said aircraft model (M) to compute aircraft modeled quantities, said aircraft modeled quantities including: aircraft accelerations $(\ddot{x},\ddot{y},\ddot{z})$, rotation velocities $(\dot{\alpha},\dot{\beta},\dot{\gamma})$, and altitude (h) as a function of aircraft surface control settings (C), thrust settings (T), and hypothesized ground altitude (g) at time (t), wherein (m) denotes said aircraft modeled quantities, wherein $P^m = [\ddot{x},\ddot{y},\ddot{z},\dot{\alpha},\dot{\beta},\dot{\gamma},h]^m = M(g,C,T,t)$, wherein, $\cdot P^m$ are state parameters corresponding to said aircraft modeled quantities;
   (d) initializing said time (t) at (t=0);
   (e) receiving an initial altitude (b) of said aircraft from a barometric altimeter on said aircraft, wherein initial aircraft velocities $(\dot{x},\dot{y},\dot{z})$ and initial aircraft orientations $(\alpha,\beta,\gamma)$ are from said navigation system;
   (f) initializing said aircraft model (M) as $M(b,\dot{x},\dot{y},\dot{z},\alpha,\beta,\gamma)$;
   (g) receiving accelerations, rotation velocities, and altitude from the output of the accelerometers, gyros, and barometric altimeter valid for said time (t), where $(\alpha)$ denotes the actual measurements of said aircraft, wherein $P^\alpha = [\ddot{x},\ddot{y},\ddot{z},\dot{\alpha},\dot{\beta},\dot{\gamma},h]^\alpha$, wherein $P^\alpha$ are state parameters corresponding to said actual measurements of said aircraft;
   (h) receiving the surface control (C) and thrust (T) settings, at time (t), from said instrument cluster;
   (i) computing a best hypothesis for the ground altitude (g) with lowest error (e) searching over g in the range (g=h to h−l), where (l) is the length of said wingspan when said aircraft is a fixed wing air vehicle or said rotary diameter when said aircraft is a rotary-winged air vehicle, and denoting ($g_{min}$) as the error minimizing hypothesized ground altitude, wherein said lowest error (e) is defined by $$e = \min_{h>g>(h-l)} \sum_{i=1}^{7} (P_i^a - (P_i^m = M(g, C, T, t)))^2;$$

and
   (j) determining whether (e)<threshold and $g_{min}$<(l) and when it is determined that (e)<threshold and $g_{min}$<(l), reporting ($g_{min}$) as ground altitude.

2. The method according to claim 1, wherein said aircraft model (M) are electronic instructions for modeling said aircraft modeled quantities.

3. The method according to claim 1, further comprising displaying said ($g_{min}$) on a visual display screen.

4. The method according to claim 1, further comprising:
   when it is determined that (e)≥threshold or $g_{min}$≥(l), incrementing said time to (t+1), and iterating through each of said tasks (g) through (j) until it is determined that (e)<threshold and $g_{min}$<(l).

5. The method according to claim 1, further comprising:
   when it is determined that additional accelerations, rotation velocities, and altitude from the output of the accelerometers, gyros, and barometric altimeter exists, incrementing said time to (t+1), and iterating through each of said tasks (g) through (j) until no additional accelerations, rotation velocities, and altitude from the output of the accelerometers, gyros, and barometric altimeter exists.

6. A non-transitory computer readable medium having stored thereon a plurality of computer executable instructions for determining how close an aircraft configured with a navigation system is to the ground, that when executed by a computer including a GPU, causes the computer to:
   (a) receive an aircraft model (M) from a navigation system of an aircraft, said aircraft having an electronic instrument cluster for takeoff and landing control, said aircraft selected from the group of aircraft consisting of fixed and rotary-winged air vehicles, said fixed wing air vehicles having a wingspan and said rotary-winged air vehicles having a rotary diameter;
   (b) use said aircraft model (M) to compute aircraft modeled quantities, said aircraft modeled quantities including: aircraft accelerations $(\ddot{x},\ddot{y},\ddot{z})$, rotation velocities $(\dot{\alpha},\dot{\beta},\dot{\gamma})$, and altitude (h) as a function of aircraft surface control settings (C), thrust settings (T), and hypothesized ground altitude (g) at time (t), wherein (m) denotes said aircraft modeled quantities, wherein $P^m=[\ddot{x},\ddot{y},\ddot{z},\dot{\alpha},\dot{\beta},\dot{\gamma},h]^m=M(g,C,T,t)$, wherein $P^m$ are state parameters corresponding to said aircraft modeled quantities;
   (c) initialize said time (t) at (t=0);
   (d) receive an initial altitude (b) of said aircraft from a barometric altimeter on said aircraft, wherein initial aircraft velocities $(\dot{x},\dot{y},\dot{z})$ and initial aircraft orientations $(\alpha,\beta,\gamma)$ from an navigation system;
   (e) initialize said aircraft model (M) as M $(b,\dot{x},\dot{y},\dot{z},\alpha,\beta,\gamma)$;
   (f) receive accelerations, rotation velocities, and altitude from the output of the accelerometers, gyros, and barometric altimeter valid for said time (t), where $(\alpha)$ denotes the actual measurements, wherein $P^\alpha=[\ddot{x},\ddot{y},\ddot{z},\dot{\alpha},\dot{\beta},\dot{\gamma},h]^\alpha$, wherein $P^\alpha$ are state parameters corresponding to said actual measurements of said aircraft;
   (g) receive the surface control (C) and thrust (T) settings, at time (t), from said instrument cluster;
   (h) compute a best hypothesis for the ground altitude (g) with lowest error (e) searching over g in the range (g=h to h−l), where (l) is the length of said wingspan when said aircraft is a fixed wing air vehicle or said rotary diameter when said aircraft is a rotary-winged air vehicle, and denoting ($g_{min}$) as the error minimizing hypothesized ground altitude, wherein said lowest error (e) is defined by $$e = \min_{h>g>(h-l)} \sum_{i=1}^{7} (P_i^a - (P_i^m = M(g, C, T, t)))^2;$$

and (i) determine whether (e)<threshold and $g_{min}$<(l) and when it is determined that (e)<threshold and $g_{min}$<(l), reporting ($g_{min}$) as ground altitude.

7. The non-transitory computer readable medium according to claim 6, wherein said aircraft model (M) are electronic instructions for modeling said aircraft modeled quantities.

8. The non-transitory computer readable medium according to claim 6, further comprising displaying said ($g_{min}$) on a visual display screen.

9. The non-transitory computer readable medium according to claim 6, further comprising:
   when it is determined that (e)≥threshold or $g_{min}$≥(l), incrementing said time to (t+1), and iterating through each of said tasks (f) through (i) until it is determined that (e)<threshold and $g_{min}$<(l).

10. The non-transitory computer readable medium according to claim 6, further comprising:
   when it is determined that additional accelerations, rotation velocities, and altitude from the output of the accelerometers, gyros, and barometric altimeter exists, incrementing said time to (t+1), and iterating through each of said tasks (f) through (i) until no additional accelerations, rotation velocities, and altitude from the output of the accelerometers, gyros, and barometric altimeter exists.

* * * * *